United States Patent [19]

Biale

[11] Patent Number: 5,057,569
[45] Date of Patent: Oct. 15, 1991

[54] PROCESS FOR MANUFACTURING A LATEX-LIPOPHILIC POLYMER

[75] Inventor: John Biale, Anaheim, Calif.

[73] Assignee: Union Oil Company of California, Los Angeles, Calif.

[21] Appl. No.: 493,999

[22] Filed: Mar. 14, 1990

[51] Int. Cl.$^5$ .......................... C08F 8/12; C08F 28/00; C08F 16/12; C08L 29/00

[52] U.S. Cl. ................................ 524/457; 525/231; 525/328.5; 525/328.9

[58] Field of Search .......................... 524/457

[56] References Cited

U.S. PATENT DOCUMENTS

| | | | |
|---|---|---|---|
| 4,318,833 | 3/1982 | Guagliardo | 524/457 |
| 4,730,021 | 3/1988 | Zom et al. | 524/457 |
| 4,888,383 | 12/1989 | Huybrechts | 524/832 |

OTHER PUBLICATIONS

Gurruchaga et al. *Journal of Polymer Science:* vol. 27:149-152, (1989) John Wiley & Sons, Inc.
Mekras et al., *Polymer,* 30:745-751 (1989).
McCormick et al., *Journal of Polymer Science:* vol. 22:49-60 (1984) John Wiley & Sons, Inc.
Mino et al., *Journal of Polymer Science:* vol. XXXI, Issue No. 122, pp. 242-243 (1958).
Paint and Surface Coatings: Theory and Practice, Lambourne, Editor, John Wiley & Sons, Halsted Press Division, pp. 97-100 (1987).
1989 Federation Paint Show Program, Federation Society of Coating Technology, 67th Annual Meeting and 54th Paint Industry Show, New Orleans, Nov. 8-10, 1989, p. 156, Hasegawa et al. abstract.

*Primary Examiner*—Joseph L. Schofer
*Assistant Examiner*—Wu C. Cheng
*Attorney, Agent, or Firm*—Gregory F. Wirzbicki; Shlomo R. Frieman

[57] ABSTRACT

Polymers comprised of a lipophilic polymer and polymerized alpha, beta-ethylenically unsaturated monomer units are formed by emulsion polymerizing alpha, beta-ethylenically unsaturated monomer units in an aqueous medium containing a lipophilic polymer having a pendant vinyl group and an initiation catalyst.

20 Claims, No Drawings

PROCESS FOR MANUFACTURING A LATEX-LIPOPHILIC POLYMER

BACKGROUND

The present invention relates to latex-lipophilic polymers and to emulsion polymerization processes for synthesizing latex-lipophilic polymers.

Polyurethanes are a highly versatile group of polymers that can be designed to incorporate a wide variety of properties, e.g., high elastic modulus, hardness, good gloss, abrasion resistance, excellent adhesion, and good weathering. Generally, polyurethanes are prepared in an organic solvent but they can also be dispersed in water. However, due to their high cost (usually running from $3 to $5 per pound on a dry basis), polyurethanes are commonly restricted to high performance applications.

Polymer emulsions or latexes are much cheaper than polyurethanes but lack some of the performance characteristics of polyurethanes.

SUMMARY OF THE INVENTION

The present invention provides an effective emulsion polymerization procedure for synthesizing polyurethane-latex polymers. In particular, the emulsion polymerization process of the present invention comprises the step of polymerizing alpha, beta-ethylenically unsaturated monomer units in an aqueous medium containing a polyurethane polymer having a pendant vinyl group at reaction conditions sufficient to polymerize (a) the alpha, beta-ethylenically unsaturated monomer units and (b) an entity containing one or more alpha, beta-ethylenically unsaturated monomer units with the polyurethane polymer.

In addition to polyurethane polymers, the emulsion polymerization procedure can also be conducted with other lipophilic polymers having at least one pendant vinyl group. As used in the specification and claims, the term "lipophilic polymer" means a polymer that is customarily not suitable for manufacture in water. The lipophilic polymers are used in either a substantially dry, solid form or in the form of a water dispersion.

The invention also encompasses the synthesized lipophilic-latex polymers which are employed in compositions such as latexes, paints, varnishes, etc. Although the lipophilic-latex polymers are cheaper per unit weight than their lipophilic polymer component, they can exhibit desirable properties characteristic of the lipophilic polymer.

DETAILED DESCRIPTION OF THE INVENTION

In the emulsion polymerization synthesis of the present invention, water is added to a reactor and heated, generally to at least about 50° F. More typically, the water is heated to at least about 100° to about 200° F, and preferably to about 150° to about 190° F. While heating the water in the reactor, the reactor is preferably purged with an inert gas, such as nitrogen, to remove substantially all oxygen from the reactor. An initiation catalyst, such as t-butyl-hydroperoxide, sodium persulfate, hydrogen peroxide, or mixtures thereof, is then added to the reactor. Preferably, a locus for polymerization (e.g., a surfactant and/or a surfactant-containing seed) is added to the reactor before, simultaneously with, or after the catalyst addition to form a reactor charge.

The surfactant can be an anionic surfactant, a nonionic surfactant, or a mixture thereof. Exemplary anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof. The sulfate and sulfonate anionic surfactants are preferred.

The seed, which acts as a locus for polymerization, generally has an average particle size of less than about 80 nm, and preferably within the range of about 25 to about 60 nm. Exemplary seeds are comprised of a surfactant and a monomer, e.g., alkenyl aromatic monomers, acrylate monomers, and mixtures thereof. Usually, styrene and/or butyl acrylate monomers are employed in manufacturing the seed.

After the addition of the catalyst and locus for polymerization, a delay-addition of the remaining materials to be added to the reactor (namely, alpha, beta-ethylenically unsaturated monomer units and a lipophilic polymer having at least one vinyl pendant group) is then commenced.

The term "lipophilic polymer" denotes a polymer that is customarily not suitable for manufacture in water. An important characteristic of the lipophilic polymers used in the present invention is that they contain at least one pendant group having olefinic (or vinyl) unsaturation of the following formula I

wherein $R_a$ is a divalent organic radical, -O-, —S—, or a covalent bond, and $R_b$ and $R_c$ are independently selected from the group consisting of hydrogen and methyl. Preferably, the divalent organic radical contains from 1 to about 20 carbon atoms, and more preferably from 1 to about 10 carbon atoms. In addition, since the reactivity of the vinyl pendant group towards free radical polymerization decreases as the substitution of the vinyl pendant group increases, it is also preferred that $R_b$ and $R_c$ each be hydrogen.

Most lipophilic polymers suitable for use in the present invention are generally prepared in an organic solvent by a condensation (addition) polymerization process and are known to those skilled in the art as "condensation polymers." Besides polyurethane polymers, other typical condensation polymers include, but are not limited to, polyester polymers, epoxy polymers, silicon polymers, polyamide polymers, and polycarbonate polymers. In general, the lipophilic polymers having pendant vinyl groups are prepared by a condensation process in a non-aqueous medium. Those skilled in the art are familiar with such lipophilic polymer synthesis techniques. See, for example, Merkas et al., *Polymer*, 30: 745-751 (1989), the publication being incorporated herein in its entirety by reference.

Preferably, the lipophilic polymers are low molecular weight polymers, typically having a molecular weight less than about 100,000, and more desirably less than about 50,000. The most desirable lipophilic polymers are polyurethane polymers, polyester polymers, and epoxy polymers. Exemplary polyurethane polymers include aliphatic urethanes and aromatic urethanes having pendant vinyl groups.

The lipophilic polymer is added to the reactor in either a substantially dry, solid form or in the form of a water dispersion. One method for obtaining substantially dry lipophilic polymers is to simply dry lipophilic polymer-containing organic solutions. The substantially dry lipophilic polymer can be dissolved in the alpha, beta-ethylenically unsaturated monomer units and then added to the reactor or can be added to the reactor in a pre-emulsion containing the lipophilic polymer, the monomer units, water, and the surfactant.

Water dispersions of lipophilic polymers containing vinyl pendant groups are prepared by incorporating acid or amine groups onto the backbone of the lipophilic polymer and then solubilizing or dispersing the polymer by adding a volatile amine or acid to form a salt. A more detailed discussion of the methods for forming water dispersions (which are also known in the art as "water-borne systems" and "water reducible polymer systems") can be found in *Paint and Surface Coatings: Theory and Practice,* Lambourne Editor, John Wiley & Sons, Halsted Press Division (1987), pages 97–100, the publication being incorporated herein in its entirety by reference. Typically, the water dispersions of lipophilic polymers contain about 5 to about 60 weight percent solids, and preferably about 20 to about 50 weight percent solids.

The water dispersion of the lipophilic polymer can be added to the reactor as a separate feed stream or together with the monomer units in a pre-emulsion that also contains water and a surfactant. The surfactant can be a copolymerizable surfactant, an anionic surfactant, or a nonionic surfactant, or a mixture thereof. Exemplary copolymerizable surfactants include, but are not limited to, sulfoethylmethacrylate vinyl sulfonate salts, sulfopropylmethacrylate, styrene sulfonate salts, 2-acrylamido-2-methylpropanesulfonic acid salts, and mixtures thereof. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide/propylene oxide block copolymers, and mixtures thereof.

To ensure that substantially all the monomer units polymerize, a polymerization catalyst is commonly added during the delay-addition step. The same initiation catalyst described above can be used as the polymerization catalyst.

The initiation (or polymerization) catalyst also functions to polymerize an entity containing one or more of the alpha, beta-ethylenically unsaturated monomer units with the lipophilic polymer through the vinyl pendant group of the lipophilic polymer.

The duration of the delay-addition procedure depends upon the batch size and the cooling capacity of the system. Typically, the delay-addition procedure can be completed in less than about five hours. When the emulsion polymerization synthesis procedure is run in a laboratory, the delay-addition procedure usually is conducted over a period of about 3 hours.

While conducting the delay-addition procedure, the temperature within the reactor is maintained at a level sufficient to promote the polymerization of the alpha, beta-ethylenically unsaturated monomer units between themselves as well as with the lipophilic polymer. Generally the temperature is maintained at about 100° to about 200° F., and preferably at about 150° to about 190° F.

In order to stabilize the emulsion, the pH of the emulsion is preferably adjusted towards the end of the delay-addition procedure. Generally, the pH is adjusted after about 60 percent, and more typically after about 75 percent, of the alpha, beta-ethylenically unsaturated monomer units and lipophilic polymer have been added to the reactor. Preferably, the pH of the emulsion is adjusted from about 30 minutes before to about 30 minutes after terminating the addition of the delay-addition ingredients. More preferably, the pH adjustment is performed within about 15 minutes after the end of the delay-addition step. Usually, the pH of the emulsion is adjusted to at least about 6, preferably to about 6 to about 8, and most preferably to about 6 to about 7.

A base is generally employed to adjust the pH of the emulsion. Exemplary bases are selected from the group consisting of amine-containing bases, hydroxyl-containing bases, and mixtures thereof. Dimethyl amine, diethyl amine, aminopropanol, ammonium hydroxide, and sodium hydroxide are typical bases, with the volatile bases being preferred, and ammonium hydroxide being the most preferred.

After the delay-addition step, the temperature within the reactor is usually held at the same level as during the delay-addition step for a "cook" period, i.e., a sufficient period of time to ensure substantially complete polymerization of the alpha, beta-ethylenically unsaturated units. Typically, the cook period runs for approximately an additional 0.25 to 2 hours, and preferably for about an additional 0.5 to about 1.5 hours. During the cook period, additional polymerization catalyst is optionally added to the reactor to further ensure substantially complete polymerization of the monomer units and the lipophilic polymer. The same polymerization catalysts employed in the delay-addition step can be employed in the cook step. In addition, a t-butyl hydroperoxide/sodium formaldehyde sulfoxylate catalyst system can also be employed in the cook step. However, the preferred initiation catalyst for use in the cook step is sodium persulfate.

When the cook step is concluded, the emulsion is allowed to cool to ambient or room temperature. The pH of the cooled emulsion is then typically adjusted to about 6 to about 10, preferably to about 7 to about 9, and more preferably to about 8 to about 9. The same bases as used to adjust the pH of emulsion at the end of the delay-addition step can be used to adjust the pH of the cooled emulsion.

The polymerization process yields an emulsion containing the polymerized lipophilic-latex polymer of the present invention. The solids content of the emulsion is almost always at least about 5 weight percent. More commonly, the emulsion contains at least about 40 weight percent solids. Preferably, about 40 to about 65 weight percent solids, and most preferably about 45 to about 55 weight percent solids, are present in the emulsion.

In an alternative procedure of the present invention, a portion of (a) the alpha, beta-ethylenically unsaturated monomer units and/or (b) the lipophilic polymer (either as a separate water dispersion feed stream or as a water dispersion-containing pre-emulsion or as a substantially dry solid dissolved in the monomer units or as a substantially dry solid-containing pre-emulsion) is charged to the reactor prior to heating the contents of the reactor. In yet another version of the invention, all of the ingredients are initially charged to the reactor and the contents of the reactor are then heated to a temperature sufficient to interpolymerize the monomer units and polymerize an entity containing at least one monomer unit with the lipophilic polymer.

The alpha, beta-ethylenically unsaturated monomer units employed in the present invention can be the same or different. When the same monomer units are used, the latex moiety of the resulting lipophilic-latex polymer is a homopolymer, and when different monomer units are used the latex moiety is a copolymer.

An exemplary class of alpha, beta-ethylenically unsaturated monomer units are alpha-olefins. Another class of alpha, beta-ethylenically unsaturated monomer units are non-hydrocarbon alpha-olefins, e.g., carboxylic acid monomers, carboxylic ester monomers, thioester monomers, nitrile monomers, and vinyl halide monomers. (As used in the specification and claims, the term "non-hydrocarbon alpha-olefins" means an alpha-olefin that further contains at least one non-carbon, non-hydrogen moiety. In other words, in addition to containing carbon and hydrogen, a non-hydrocarbon alpha-olefin also contains at least one other chemical species, e.g., sulfur, oxygen, nitrogen, halogen, etc.) Each of these classes of alpha, beta-ethylenically unsaturated hydrocarbons preferably contains 2 to about 20 carbon atoms, more preferably about 3 to about 10 carbon atoms, and most preferably about 4 to about 10 carbon atoms.

Alternatively, the alpha, beta-ethylenically unsaturated monomer units are also classifiable as soft monomers and hard monomers, as well as functional monomers and non-functional monomers. As used in the specification and claims, the term "soft monomer" means a monomer whose homopolymer has a $T_g$ of less than about $-20°$ C.; the term "hard monomer" means a monomer whose homopolymer has a $T_g$ of greater than about 30° C.; the term "functional monomer" means a monomer that contains a group, e.g., hydroxyl, carboxyl, amide, and amine, that can undergo further reaction after polymerization of the polymer; and the term "non-functional monomer" means a monomer that is devoid of any group capable of undergoing further reaction after polymerization of the monomer.

With respect to soft monomers, soft monomers include, but are not limited to, carboxylic ester monomers, vinylidene halide monomers, alkylene monomers, maleate esters, Vinyl Versatate, and alkadiene monomers. Typical soft non-functional carboxylic ester monomers are acrylic monomers having the formula II

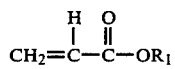
(II)

wherein $R_1$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers are ethyl acrylate, butyl acrylate, isobutyl acrylate, and ethylhexyl acrylate. Butyl acrylate and 2-ethylhexyl acrylate are preferred soft, non-functional monomers.

Functional, soft carboxylic ester monomers include hydroxyalkyl acrylate monomers having the formula III

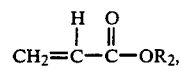
(III)

and aminoalkyl acrylate monomers having the formula IV

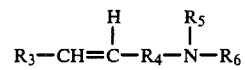
(IV)

In formula III, supra, $R_2$ is a hydroxyalkyl group, preferably comprising up to about 6 carbon atoms. More preferably, the hydroxyalkyl group comprises up to 3 carbon atoms. Typical hydroxyalkyl acrylates include, but are not limited to, hydroxyethyl acrylate, hydroxypropyl acrylate, and mixtures thereof.

In formula IV, supra, $R_3$ is selected from the group consisting of hydrogen and halogen, $R_4$ is a divalent alkyl radical containing 1 to about 5 carbon atoms, and $R_5$ and $R_6$ are each independently selected from the group consisting of hydrogen and alkyl radicals containing up to about 2 carbon atoms. An exemplary aminoalkyl acrylate is dimethylaminoethyl acrylate, t-butylaminoethyl acrylate, and mixtures thereof.

Illustrative soft alkylene monomers include, but are not limited to, isobutylene, ethylene, and propylene.

Exemplary alkadiene monomers have the formula V

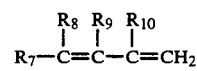
(V)

wherein $R_7$, $R_8$, $R_9$, and $R_{10}$ are each independently selected from the group consisting of hydrogen, halogen, and alkyl radicals containing 1 to about 2 carbon atoms. Commercially available alkadiene monomers include butadiene, isoprene, 1,3-pentadiene, 2-ethyl butadiene, and 4-methyl-1,3-pentadiene. The preferred alkadiene monomer is butadiene.

Regarding the hard monomers, common hard monomers include vinyl halides, acrylonitrile, vinyl acetate, methacrylamide, alkylene aromatic monomers, carboxylic ester monomers, and olefinic carboxylic acid monomers. As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula VI

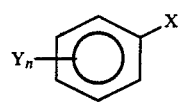
(VI)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred substituents on the alkenyl group are halogen radicals, e.g., chloride. However, the most preferred alkenyl group is unsubstituted, i.e., a hydrocarbon, and contains only one olefinic unsaturation. Vinyl is the most preferred X.

Y is an organic or inorganic radical. As used throughout the specification and claims, the term "organic radical" means any group containing at least one carbon atom, and the term "inorganic radical" means any group devoid of carbon atoms. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, p-methyl styrene, m-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. Due to its commercial availability and low cost, styrene is the preferred alkenyl aromatic monomer.

With respect to hard non-functional carboxylic ester monomers, exemplary non-functional carboxylic ester monomers are methacrylic monomers having the formula VII

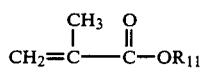
(VII)

wherein $R_{11}$ is an alkyl group that preferably contains up to about 6 carbon atoms. Typical non-functional methacrylic monomers include methyl methacrylate, ethyl methacrylate, isobutyl methacrylate, isobornyl methacrylate, and mixtures thereof.

Functional, hard carboxylic ester monomers include hydroxyalkyl methacrylate monomers having the formula VIII

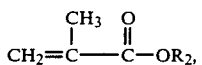
(VIII)

and aminoalkyl methacrylate monomers having the formula IX

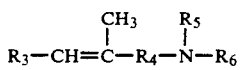
(IX)

wherein $R_2$, $R_3$, $R_5$, and $R_6$ are as defined above.

Olefinic carboxylic acid monomers include both olefinic mono-carboxylic acid monomers and olefinic di-carboxylic acid monomers. Exemplary olefinic mono-carboxylic acids include, but are not limited to, acrylic acid, methacrylic acid, acryloxyacetic acid, methacryloxyacetic acid, acrylamidoglycolic acid, and mixtures thereof. Exemplary olefinic di-carboxylic acids include, but are not limited to, itaconic acid, fumaric acid, and mixtures thereof. The preferred olefinic carboxylic acid monomers are selected from the group consisting of acrylic acid, methacrylic acid, and mixtures thereof.

The halide moiety of the vinyl halide and vinylidene halide monomers is preferably either chloride or bromide, with chloride being the most preferred halide moiety.

Other functional monomers that are optionally employed, include, but are not limited to, ethylene ureido-containing monomers, cyanoacetoxy-containing monomers, and acetoacetoxy-containing monomers. The ethylene ureido-containing monomers contain an ethylene ureido group of the formula X:

(X)

Exemplary ethylene ureido-containing monomers include, but are not limited to, 2-ethylene ureido-ethyl acrylate, 2-ethylene ureido-methyl acrylate, 2-ethylene ureido-ethyl acrylamide, 2-ethylene ureido-ethyl methacrylamide, and 1-[2-(3-alloxy-2-hydroxypropylamino)ethyl]imidazolidin-2-one. The preferred ethylene ureido-containing monomer is 1-[2-(3-alloxy-2-hydroxypropylamino)ethyl]imidazolidin-2-one, commercially known as Sipomer WAM brand monomer and available from Alcolac Chemical Co.

Cyanoacetoxy-containing monomers and acetoacetoxy-containing monomers have the formulas XI and XII, respectively,

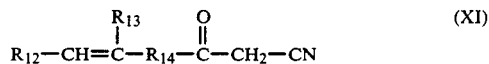
(XI)

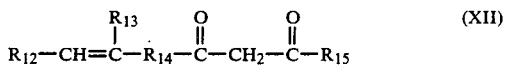
(XII)

wherein $R_{12}$ is selected from the group consisting of hydrogen and halogen, $R_{13}$ is selected from the group consisting of hydrogen, halo, thio, and monovalent organic radicals, $R_{14}$ is a divalent radical, and $R_{15}$ is selected from the group consisting of hydrogen and monovalent organic radicals.

The ethylene ureido-containing monomers, the cyanoacetoxy-containing monomers, and the acetoacetoxy-containing monomers, when used, are generally employed in a concentration sufficient to enhance the wet adhesion strength of the emulsion, e.g., from about 0.25 to about 1 weight percent wet adhesion monomer based on the total weight of the graft polymer.

In addition, a cross-linking agent is optionally employed in synthesizing the graft polymer. When used, the cross-linking agent is generally added simultaneously during the addition of the monomer units. Typical cross-linking agents include, but are not limited to, N-methylol acrylamide, N-methylol methacrylamide, diacrylates, dimethacrylates, triallyl cyanurate, diallyl maleate, methyl acrylamidoglycolate methyl ether, olefinically unsaturated monomers having the formula XIII

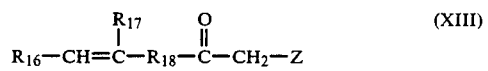
(XIII)

and mixtures thereof, wherein $R_{16}$ is selected from the group consisting of hydrogen and halogen, $R_{17}$ is selected from the group consisting of hydrogen, halo, thio, and monovalent organic radicals, $R_{18}$ is a divalent radical, and Z is selected from the group consisting of organoacyl and cyano. Preferably $R_{16}$ is hydrogen, $R_{17}$ is hydrogen or an alkyl radical having up to about 10 carbon atoms, $R_{18}$ is a cyclic or acyclic organic radical containing up to about 40 carbon atoms, and Z is an organoacyl having the formula XIV

(XIV)

wherein $R_{19}$ is selected from the group consisting of hydrogen and monovalent organic radicals. More preferably, $R_{18}$ is an acyclic radical containing up to about 20 atoms in length, with any and all side groups each being up to about 6 atoms in length, and $R_{19}$ is hydrogen or an alkyl group containing up to about 7 carbon atoms. $R_{18}$ is most preferably an alkylene group containing up to about 10 carbon atoms, and $R_{19}$ is most preferably methyl. Due to its commercial availability, the preferred cross-linking agent of formula XII is acetoacetoxyethyl methacrylate. However, the most preferred cross-linking agent is N-methylol acrylamide.

When a cross-linking agent is employed, the graft polymer generally contains about 0.2 to about 5 weight percent cross-linking agent, but preferably about 1 to about 3 weight percent cross-linking agent. As used in the specification and claims, the term "weight percent cross-linking agent" means the total dry weight of the cross-linking agent employed in making the latex-lipophilic polymer divided by the total weight of the alpha, beta-ethylenically unsaturated monomer units employed in making the latex-lipophilic polymer, this quotient being multiplied by 100%.

Because of the presence of the vinyl pendant group on the initial lipophilic polymer used in the present invention, the lipophilic-latex polymer characteristically contains moieties that, when the latex-lipophilic polymer is subjected to a hydrolysis procedure, yields a 1,2-diol-containing compound. As used in the specification and claims, the "hydrolysis procedure" entails placing a 2 g sample of the latex-lipophilic polymer into a 125 ml Erlenmeyer flask, adding 20 ml of 2 N sodium hydroxide, fitting the flask with a micro reflux condenser, adding a boiling chip to the flask, and heating the solution under reflux for about one hour.

Generally, the concentration of the alpha, beta-ethylenically unsaturated monomers and the lipophilic polymer in the aqueous medium is sufficient for the latex-lipophilic polymer to have a content, based on the weight of the latex-lipophilic polymer, of up to about 50 weight percent lipophilic polymer and at least about 50 weight percent alpha, beta-ethylenically unsaturated monomer units. To keep the latex-lipophilic polymer cost effective, it is preferred that the latex-lipophilic polymer contain up to about 25 weight percent lipophilic polymer and at least 75 weight percent alpha, beta-ethylenically unsaturated monomer units, each weight percent being based on the weight of the latex-lipophilic polymer. Usually, the latex-lipophilic polymer comprises at least about 0.1 weight percent, and preferably at least about 1 weight percent, lipophilic polymer. More preferably, the latex-lipophilic polymer comprises about 1 to about 20 weight percent lipophilic polymer and about 80 to about 99 weight percent alpha, beta-ethylenically unsaturated monomer units.

The resulting latex-lipophilic polymer can exhibit performance characteristics of the lipophilic polymer component while costing less per unit weight than the latex-lipophilic polymer's lipophilic polymer component.

The latex-lipophilic polymers and emulsions of the present invention have many utilities. These applications include use as (a) a water-resistant film, (b) a binder in paints and varnishes, (c) a pressure-sensitive adhesive, (d) a laminating adhesive, (e) a wood, plastic, roofing, and street surface coating, and (f) the solid phase in medical diagnostic analysis. When used in a composition, such as a paint, a varnish, or other coating, the composition is applied to at least a portion of a surface of a substrate. Upon drying, the composition forms a film.

The following example illustrates the preparation of an exemplary latex-lipophilic polymer within the scope of the present invention. However, the invention is not limited to the example, but is defined by the claims.

EXAMPLE

PREPARATION OF GRAFT POLYMER

A monomer mixture comprising styrene (about 315 g), butyl acrylate (about 120 g), ethylhexyl acrylate (about 60 g), acrylonitrile (about 60 g), methacrylic acid (about 15 g), and a polyurethane polymer having pendant vinyl groups (about 60 g) is prepared. A solution comprising about 200 g water and about 5 g Alipal C0436 brand anionic surfactant (available form GAF) is also prepared.

Water (about 350 g) is added to a reactor and heated while purging the reactor with nitrogen. When the water reaches a temperature of about 180° F., about 0.5 g sodium persulfate and about 18 g of a solution containing a polystyrene seed (about 30% solids, the seed having a particle size of about 30 nm) are individually added to the reactor. Next, a pre-emulsion comprising the monomer mixture and the solution are delay-added to the reactor over a period of about three hours while maintaining the temperature within the reactor of about 185° F. During the delay-addition, additional initiation catalyst and a graft promoting system are simultaneously introduced into the reactor via a solution containing about 0.5 g sodium persulfate, about 30 g water, about 0.5 g cerium ammonium nitrate, and about 0.5 g nitric acid.

At the end of the three hour period, the contents of the reactor are neutralized with a solution containing about 6 ml of ammonium hydroxide and about 20 ml of water.

Although the present invention has been described in considerable detail with reference to certain preferred versions thereof, other versions are possible. For example, other ingredients such as chain-transfer agents can be present in the aqueous medium during the emulsion polymerization procedure of the present invention. Therefore, the spirit and scope of the appended claims should not necessarily be limited to the description of the preferred embodiments contained herein.

What is claimed is:

1. A synthesis process comprising the steps of:
(a) dissolving at least one substantially dry, solid lipophilic polymer having at least one vinyl-containing pendant group of the formula

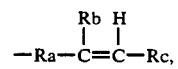

wherein Ra is a divalent organic radical, —O—, —S—, or a covalent bond, and Rb and Rc are independently selected from the group consisting of hydrogen and methyl, in a plurality of alpha, beta-ethylenically unsaturated monomer units to form a reactor feed;
  (b) combining the reactor feed formed in step (a) with an aqueous solution comprising an initiation catalyst to form a reaction medium; and
  (c) polymerizing the alpha, beta-ethylenically unsaturated monomer units in the lipophilic polymer-containing reaction medium at reaction conditions sufficient to form a latex-lipophilic polymer composed of the lipophilic polymer and polymerized alpha, beta-ethylenically unsaturated monomers units, the latex-lipophilic polymer containing moieties that, when the latex-lipophilic polymer is subjected to a hydrolysis procedure, yield a 1,2-diol-containing compound, wherein the hydrolysis procedure entails placing a 2 sample of the latex-lipophilic polymer into a 125 ml Erlenmeyer flask, adding 20 ml of 2 N sodium hydroxide, fitting the flask with a micro reflux condenser, adding a boiling chip to the flask, and heating the solution under reflux for about one hour.

2. The process of claim 1 wherein the reaction medium further comprises a locus for polymerization.

3. The process of claim 1 wherein the lipophilic polymer has a plurality of the vinyl-containing pendant groups and step (c) further includes polymerizing a plurality of monomer-containing entities with the lipophilic polymer.

4. The process of claim 1 wherein step (c) further includes adjusting the temperature of the reaction medium to a temperature that is at least sufficient to initiate polymerization of the monomer units in the reaction medium.

5. The process of claim 4 wherein after step (c) the process further comprises the step (d) of adding a polymerization catalyst and additional alpha, beta-ethylenically unsaturated monomer units, and additional vinyl pendant group-containing lipophilic polymer to the reaction medium.

6. The process of claim 1 wherein at least a portion of the process id conducted under a substantially inert atmosphere.

7. The process of claim 1 wherein the lipophilic polymer is a low molecular weight polymer.

8. The process of claim 7 wherein the lipophilic polymer has a molecular weight of less than about 100,000.

9. The process of claim 1 wherein the concentration of the alpha, beta-ethylenically unsaturated monomer units and the lipophilic polymer in the reaction medium is sufficient for the latex-lipophilic polymer to have a content, based on the weight of the latex-lipophilic polymer, of about 0.1 to about 50 weight percent lipophilic polymer and at least about 50 weight percent alpha, beta-ethylencially unsaturated monomer units.

10. The process of claim 1 wherein step (c) includes the step of polymerizing the latex-lipophilic polymer by an emulsion polymerization procedure; the reaction medium further comprises a locus for polymerization; at least a portion of the process is conducted under a substantially inert atmosphere; the lipophilic polymer is a condensation polymer; and the concentration of the alpha, beta-ethylenically unsaturated monomer units and the lipophilic polymer in the reaction medium is sufficient for the latex-lipophilic polymer to have a content, based on the weight of the latex-lipophilic polymer, of about 0.1 about 50 weight percent lipophilic polymer and at least about 50 weight percent alpha, beta-ethylenically unsaturated monomer units.

11. A synthesis process comprising the steps of:
  (a) dissolving at least one substantially dry solid, condensation polymer having at least one vinyl-containing pendant group of the formula

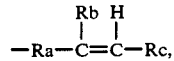

wherein Ra is a divalent organic radical, —O—, —S—, or a covalent bond, and Rb and Rc are independently selected from the group consisting of hydrogen and methyl, in a plurality of alpha, beta-ethylenically unsaturated monomer units to form a reactor feed;
  (b) combining the reactor feed formed in step (a) with an aqueous solution comprising an initiation catalyst to form a reaction medium; and
  (c) polymerizing the alpha, beta-ethylenically unsaturated monomer units in the condensation polymer-containing reaction medium at reaction conditions sufficient to form a latex-condensation polymer composed of the condensation polymer and polymerized alpha, beta-ethylenically unsaturated monomers units, the latex-condensation polymer containing moieties that, when the latex-condensation polymer is subjected to a hydrolysis procedure, yield a 1,2-diol-containing compound, wherein the hydrolysis procedure entails placing a 2 g sample of the latex-condensation polymer into a 125 ml Erlenmeyer flask, adding 20 ml of 2 N sodium hydroxide, fitting the flask with a micro reflux condenser, adding a boiling chip to the flask, and heating the solution under reflux for about one hour.

12. The synthesis process of claim 11 wherein the condensation polymer is selected from the group consisting of polyurethane polymers, polyester polymers, and epoxy polymers.

13. A latex comprising an aqueous suspension of a latex-lipophilic polymer, the latex-lipophilic polymer comprising a lipophilic polymer and a polymer comprised of polymerized alpha, beta-ethylenically unsaturated monomer units, wherein the lipophilic polymer contains a moiety that, upon subjecting the latex-lipophilic polymer to an hydrolysis procedure, yields a 1,2-diol-containing product.

14. A film formed by drying the composition of claim 13.

15. The process of claim 1 wherein the divalent organic radical contains from 1 to about 20 carbon atoms.

16. The process of claim 1 wherein the divalent organic radical contains from 1 to about 10 carbon atoms and Rb and Rc are each hydrogen.

17. A synthesis process comprising the steps of:
  (a) combining (i) at least one substantially dry, solid lipophilic polymer having at least one vinyl-containing pendant group of the formula

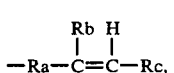

wherein Ra is a divalent organic radical, —O—, —S—, or a covalent bond, and Rb and Rc are independently selected from the group consisting of hydrogen and methyl, (ii) a plurality of alpha, beta-ethylenically unsaturated monomer units, (iii) water, and (iv) a surfactant to form a pre-emulsion;

(b) combining the pre-emulsion formed in step (a) with an aqueous solution comprising an initiation catalyst to form a reaction medium; and (c) polymerizing the alpha, beta-ethylenically unsaturated monomer units in the lipophilic-containing reaction medium at reaction conditions sufficient to form a latex-lipophilic polymer composed of the lipophilic polymer and polymerized alpha, beta-ethylenically unsaturated monomer units, the latex-lipophilic polymer containing moieties that, when the latex-lipophilic polymer is subjected to a hydrolysis procedure, yield a 1,2-diol-containing compound, wherein the hydrolysis procedure entails placing a 2 g sample of the latex-lipophilic polymer into a 125 ml Erlenmeyer flask, adding 20 ml of 2 N sodium hydroxide, fitting the flask with a micro reflux condenser, adding a boiling chip to the flask, and heating the solution under reflux for about one hour.

18. The procedure of claim 17 wherein the lipophilic polymer is a condensation polymer and the divalent organic radical contains from 1 to about 20 carbon atoms.

19. The process of claim 17 wherein the lipophilic polymer is selected from the group consisting of polyurethane polymers, polyester polymers, and epoxy polymers and the divalent organic radical contains from 1 to about 10 carbon atoms and $R_b$ and $R_c$ are each hydrogen.

20. The process of claim 17 wherein the aqueous solution further comprises a locus for polymerization.

* * * * *

UNITED STATES PATENT AND TRADEMARK OFFICE
CERTIFICATE OF CORRECTION

PATENT NO. : 5,057,569

DATED : October 15, 1991

INVENTOR(S) : John Biale

It is certified that error appears in the above-identified patent and that said Letters Patent is hereby corrected as shown below:

Claim 1, column 11, line 19, after "2" insert -- g --.

Claim 6, column 11, line 44, replace "id" with -- is --.

Claim 10, column 12, line 1, after "0.1" insert -- to --.

Signed and Sealed this

Thirteenth Day of April, 1993

Attest:

STEPHEN G. KUNIN

*Attesting Officer*         *Acting Commissioner of Patents and Trademarks*